Dec. 22, 1931.   J. S. STEWART   1,837,377
AGRICULTURAL MACHINE
Filed March 6, 1928    3 Sheets-Sheet 1
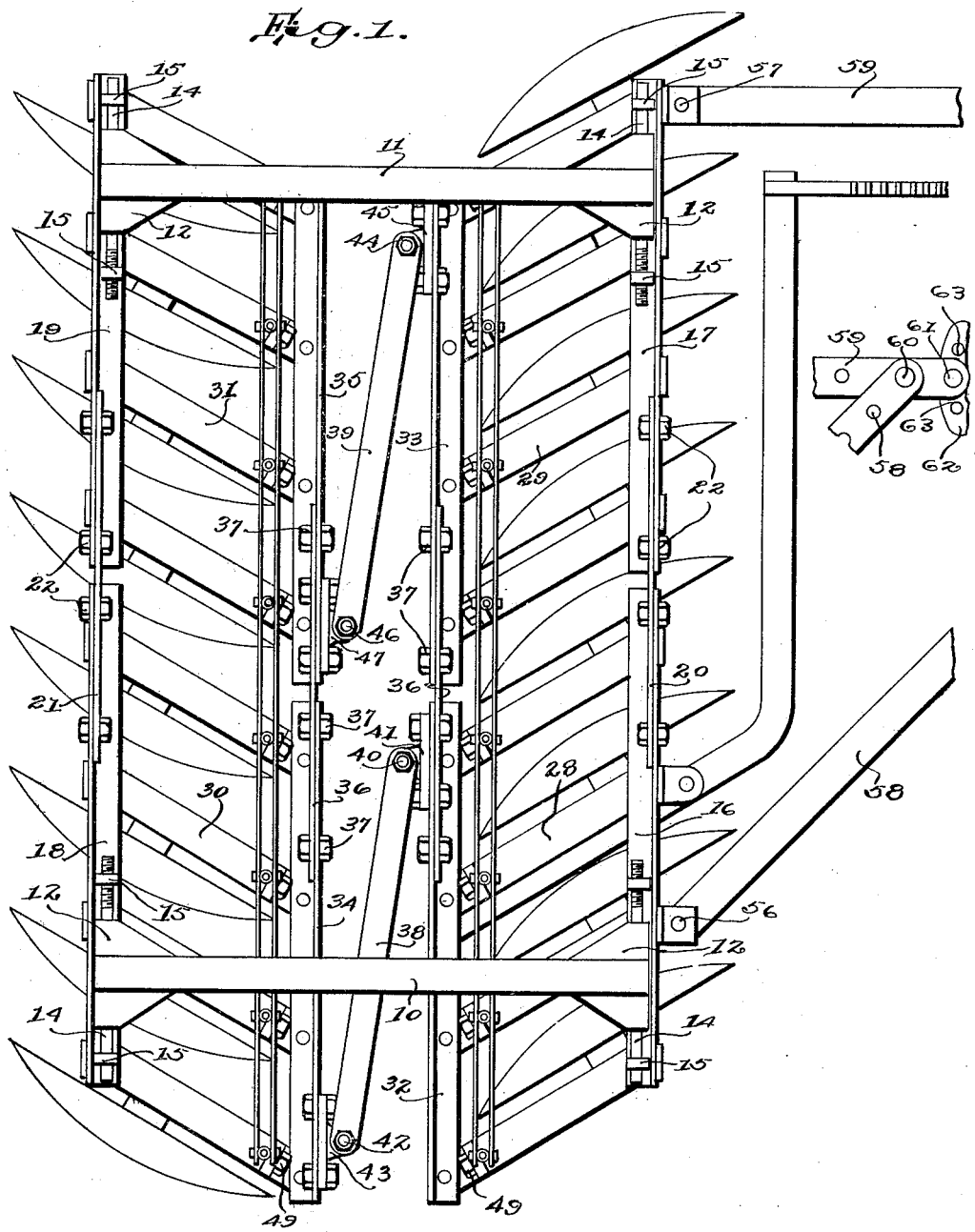
INVENTOR
J.S. STEWART
BY Munn & Co
ATTORNEY Dec. 22, 1931. J. S. STEWART 1,837,377
AGRICULTURAL MACHINE
Filed March 6, 1928 3 Sheets-Sheet 2
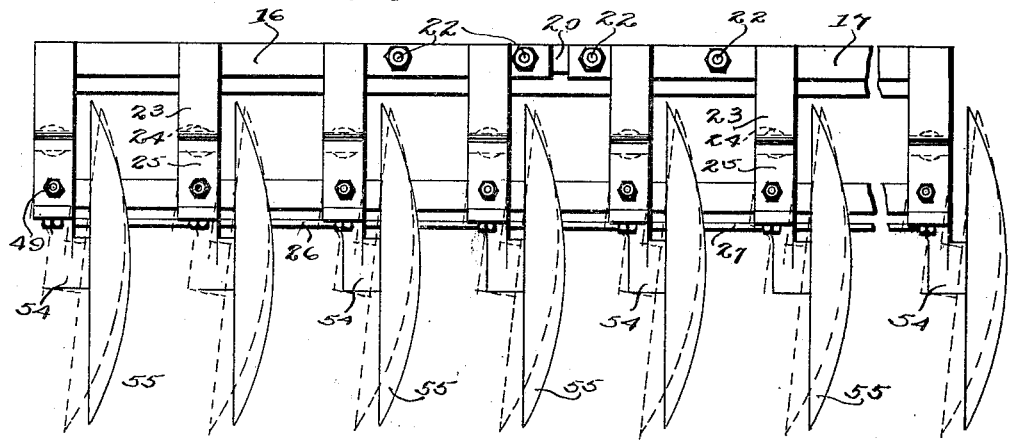
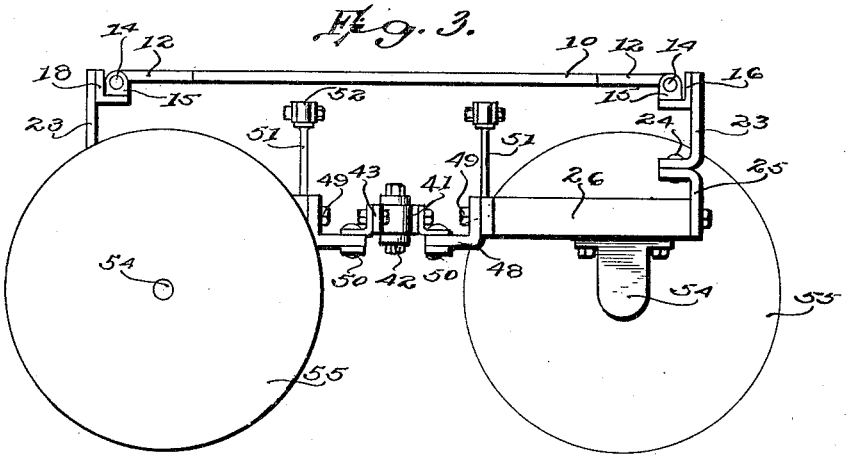
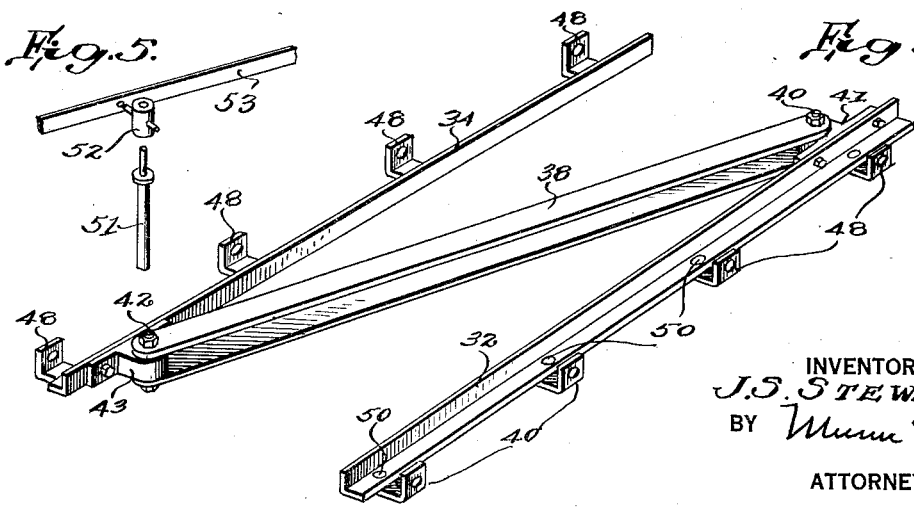
INVENTOR
J. S. STEWART
BY
ATTORNEY Dec. 22, 1931.  J. S. STEWART  1,837,377
AGRICULTURAL MACHINE
Filed March 6, 1928   3 Sheets-Sheet 3
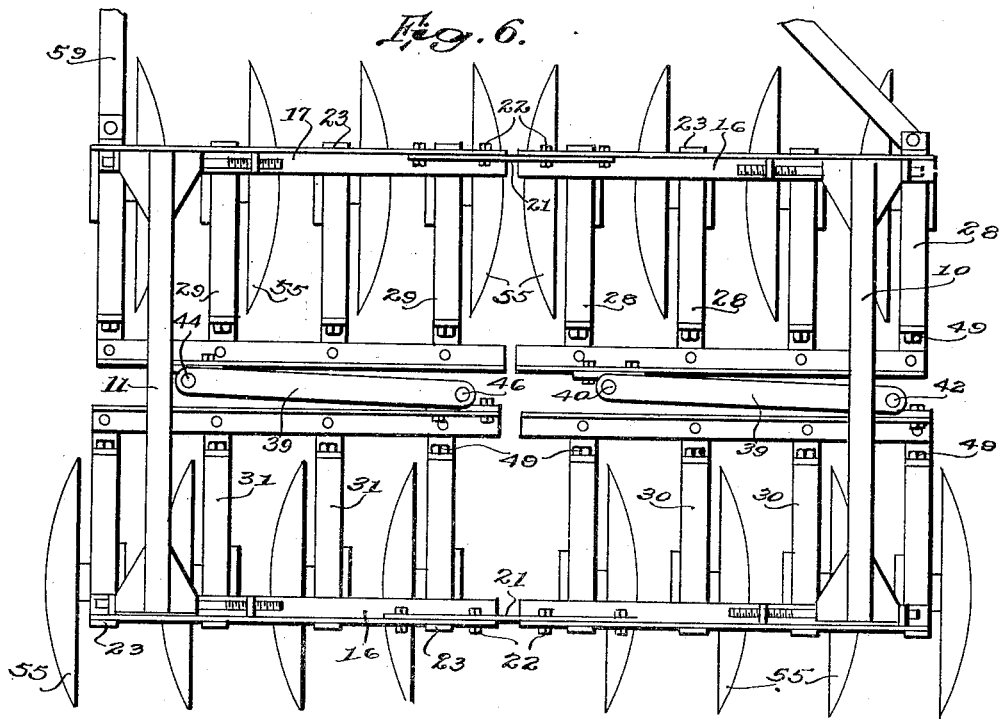
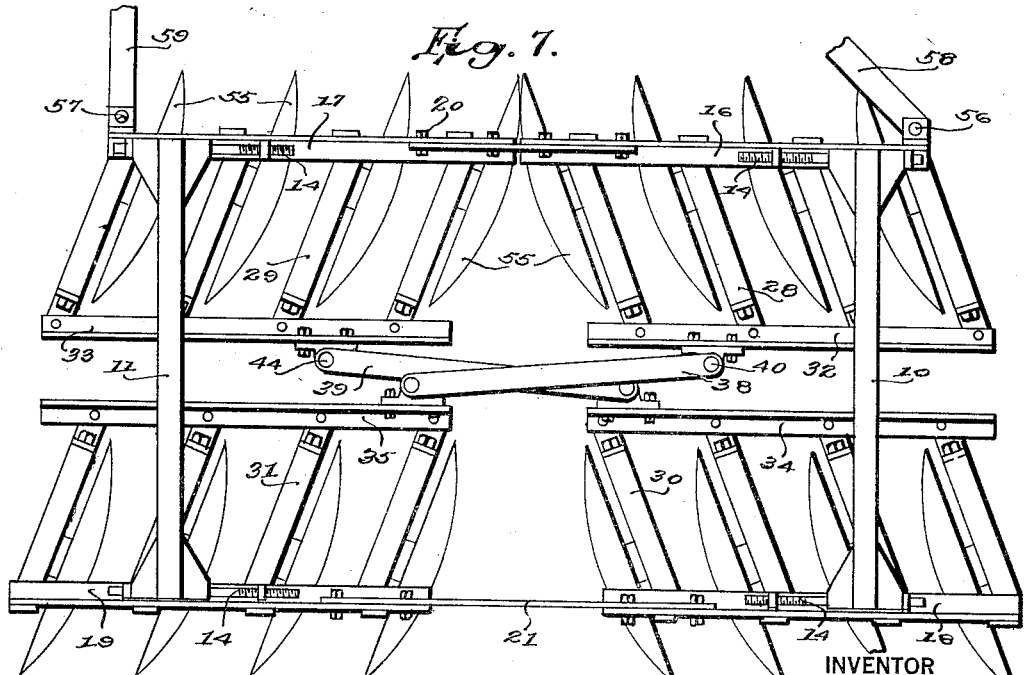
INVENTOR
J. S. STEWART
BY
ATTORNEY Patented Dec. 22, 1931

1,837,377

UNITED STATES PATENT OFFICE

JAMES S. STEWART, OF REDLANDS, CALIFORNIA, ASSIGNOR, BY MESNE ASSIGNMENTS, TO GEORGE VOSS, OF SAN BERNARDINO, CALIFORNIA

AGRICULTURAL MACHINE

Application filed March 6, 1928. Serial No. 259,486.

This invention relates to improvements in agricultural machines generally, and more particularly to a type of such machines which are employed in cultivating or otherwise conditioning the soil after a plowing operation thereon has been completed, or after a harvest season, when the previously plowed ground is still in a workable state.

The principal object of the invention is to provide for a machine of the class set forth, and one which embodies certain refinements of construction and arrangement of parts, such as will provide for a marked increase in efficiency and ease in operation, as compared with similar known types of such machines, and which will function in a manner to accomplish numerous soil cultivating or conditioning operations as can now be performed only with a different or separate machine for each particular operation.

A further object of the invention is to provide for an agricultural machine as hereinbefore characterized, and one of two or more interconnected or coupled units of gangs of cultivator or harrow elements, preferably of the disc type, which will be of comparatively light draft by reason of a shorter coupling means being provided between the units or gangs, and consequently a much less turning radius will be required for effecting the proper reversing of the direction of travel of the machine at the opposite ends of its normal straightaway travel across a field or orchard.

Another object of the invention is to provide for a cultivator or harrow construction of the gang disc type, and one wherein the arrangement of the several discs of each gang, with respect to their supporting frames, effects an even and uniform penetration of the soil by all of the discs, and in a manner that the usual tilting or up-ending of one corner or end of the supporting frame, which ordinarily causes uneven soil cultivation and non-uniformity of penetration of the discs, is prevented.

A further object of the invention is to provide for a cultivator or harrow of the character mentioned, and one which is capable of a wide range of frame adjustment, as well as an interchangeability of the operative positions of the discs, whereby the disc units or gangs may be moved to offset positions, to ordinary position for open field cultivation without throwing the cultivated soil at an appreciable distance from the discs, to dispose the discs in angular position with respect to the forward travel of the machine, to throw the conditioned soil outwardly in one or both directions from the longitudinal center of the machine as is useful in leveling lettuce and cantaloupe beds or the like, or to a position where all of the several discs will be angularly positioned to throw the soil toward the center of the machine for the building up of such beds with equal facility.

With the foregoing and other equally important objects and advantages in view, the invention resides in the certain new and useful combination, construction and arrangement of parts as will be hereinafter more fully described, set forth in the appended claims, and illustrated in the accompanying drawings, in which:

Figure 1 is a top plan view of a preferred embodiment of the invention showing the cultivator or harrow members or discs disposed in opposite angular relation, one set of the discs with respect to the other, whereby the cultivated soil will be thrown in one direction, or to the right-hand side of the machine by the front or leading gang of discs, while the soil will be thrown in the opposite direction or toward the left-hand side of the machine by the rear or trailing gang of discs, Figure 2 is a front elevation of the machine, and showing the angular adjustment of the cultivator or harrow members or discs from the vertical, Figure 3 is a side elevation of the same, Figure 4 is an enlarged perspective detail of one of the coupling members employed for connecting the adjacent units or gangs together, Figure 5 is a similar view of one of the pivot members utilized for effecting the proper or desired adjustment of the several cultivator or harrow members or discs of each unit or gang, Figure 6 is a view similar to that of Figure 1, but showing an arrangement of the cultivator or harrow members or discs in another position of use, as for travel from one point of use to another, or for bedding or hilling operations, and Figure 7 is another view, similar to that of Figure 1, but showing the arrangement of the cultivator or harrow members or discs as they appear when the frames are adjusted to position the same to throw the plowed soil outward from the opposite sides of the machine as would be useful in levelling down previously formed beds or hills.

Referring to the drawings, wherein similar characters of reference designate corresponding parts throughout the several views thereof, the embodiment of the invention by way of example is constituted generally in a main frame which as shown therein comprises oppositely spaced parallel longitudinal frame members or bars 10 and 11, each having angularly shaped attaching bracing members or plates 12 preferably of triangular form secured to the opposite ends thereof. Depending from the outer side of these members or plates 12 are pairs of spaced ears 13, which lie parallel to the frame bars 10 and 11 and are apertured to have adjusting members or screws 14 passed through the same. These members or screws 14 are also mounted for turning adjustment movements in pairs of ears 15 spaced longitudinally of the upper sides of transversely disposed and alined front frame members or sections 16 and 17 and rear frame members or sections 18 and 19, complementally disposed to the front and rear ends of the longitudinal side or frame members or bars 10 and 11, respectively. These pairs of front and rear frame members 16, 17 and 18, 19 each have their adjacent ends adjustably connected together by means of intermediate sections 20 and 21 respectively, which are bolted thereto, as at 22. The longitudinal side frame members 10 and 11 and the splice members or bars 20 and 21 are preferably in the form of flat iron bars, while the transverse frame members or sections 16, 17, 18 and 19 are preferably in the form of suitable lengths of angle iron, L-shaped in cross section, substantially as shown.

Supported from the main frame aforesaid are a series of auxiliary frames, which are made up of angle members or brackets 23, depending from the outer sides of the frame members 16, 17, 18 and 19 to the horizontally angled lower ends of which are secured by means of bolts or the like 24, the similarly angled upper ends of lower members or brackets 25 rising from pairs of lower longitudinal frame members or sections 26 and 27, which are of a length corresponding to that of the upper members or sections 16, 17, 18 and 19. These lower bars 26 and 27, at the forward side of the machine, as shown in Figure 2, are complemental to the upper members or bars 16 and 17, and are duplicated complementally to the upper members or bars 18 and 19 at the rear side thereof.

Extending rearwardly from each of the front lower members or bars 26 and 27, and pivoted thereto, are sets of parallel carrier members or bars 28 and 29 respectively, and forwardly from each of the rearwardly disposed members or bars 26 and 27, and also pivoted thereto are a like number of similarly disposed carrier members or bars 30 and 31. The free ends of each group or set of carrier members or bars 28, 29, 30 and 31 are inter-connected in the parallel relation aforesaid by means of frame members or bars 32, 33, 34 and 35 respectively, which extend transversely of the machine in parallel relation to the complemental of the front and rear lower members or bars 26 and 27. The adjacent ends of the frame members or bars 32 and 33, carried at the rear ends of the carrier members or bar groups 28 and 29, and the like ends of the similar frame members or bars 34 and 35 at the forward ends of the forward member or bar groups 30 and 31, are each normally connected together by means of a splice bar 36, which is fastened in proper position by means of bolts or the like 37. Extending diagonally between the complementally disposed pairs of the lower and inner of the frame members or bars 32, 34 and 33, 35 are coupling members or bars 38 and 39, respectively. The forwardly directed end of the coupling member or bar 38 is pivoted, as at 40, to a bracket or the like 41 secured to the inner end portion of the frame member or bar 32, while its rearwardly connected end is likewise pivoted, as at 42, to a bracket or the like 43 secured at the outer end of the frame member or bar 34. Similarly, the forward end of the coupling member or bar 39 is pivoted, as at 44, to a bracket 45 secured at the outer end of the frame member or bar 33, and its rearwardly directed end, as at 46, to a bracket 47 secured to the inner end portion of the frame member or bar 35.

The ends of the carrier members or bars 28, 29, 30 and 31 are each attached to the lower and inner transverse frame members or bars 32, 33, 34 and 35, by means of angle members 48, which have their vertical portions fastened to the complemental ends of the carrier members or bars 28, 29, 30 and 31 by means of screws or the like 49, and their lower horizontal portions pivotally secured, as at 50, to the underside of the frame members or bars 32, 33, 34 and 35.

Rising from each of the several carrier members or bars 28, 29, 30 and 31 is a rod or spindle 51, the several rods or spindles 51 of the two front groups of carrier members or bars 28 and 29 being disposed in transverse alinement one with the other, and those of the two rear groups of the carrier members or bars 30 and 31 are similarly disposed. The upper ends of the several rods or spindles 51 of each transverse set of the same are journaled in bearing members 52, which are secured in position between pairs of oppositely disposed connecting members or bars 53, which act to brace and otherwise strengthen the inner transverse sets of the front or leading and the rear or trailing frame sections thus provided. Depending from the undersides of each of the carrier members or bars 28, 29, 30 and 31 are transversely angled axles or spindles 54, on each of which is journaled a disc type of cultivator or harrow 55. It is to be noted that the forward ends of the carrier member or bar groups 28 and 29 to the rear ends of the carrier members or bar groups 30 and 31 are attached to the frame members or bars 16 and 17 on the one hand, and the like frame members or bars 18 and 19 on the other hand, by angled members similar to the members or brackets 48 by means of the pivot bolts or the like 49 and the pivot members 50, the latter being engaged through the horizontal flanges of the several frame members or bars 16, 17, 18 and 19, whereby the several carrier members or bars 28, 29, 30 and 31 may be swung to angular positions in either direction transversely of the machine, substantially as is shown in Figures 1 and 7, from a normally parallel position in the longitudinal direction of the supporting frame of the machine. Also the several carrier members or bars 28, 29, 30 and 31 may be rocked on the pivot bolts 49 at their opposite ends to dispose the disc blades 55 at an angle to their normal vertical position of operation.

Pivotally attached to the front transversely extending frame members or bars 16 and 17 toward the opposite outer ends thereof, as at 56 and 57 respectively, are a pair of draft members or bars 58 and 59. As shown, the draft member or bar 58 is preferably disposed in angular relation to the forward side of the frame of the machine for connection, as at 60, to the forward end portion of the other draft portion 59, which also extends forwardly of the frame, and normally in a plane parallel to the longitudinal side of the latter. Detachably connected, as at 61, to the extreme forward end of the draft member or bar 59 is a tractor coupling or the like 62. The pivot connection of the coupling 62 to the draft member or bar 59 may be varied by changing the detachable connection or coupling pin 61 from its engagement with the centrally disposed aperture formed in the rear side of the coupling 62, as shown, to one or the other of the apertures 63 disposed at the opposite sides of the central aperture aforesaid. By varying the point of connection 60 of the forward end portions of the draft members or bars 58 and 59, in a series of spaced apertures 64 and 65 respectively thereto, the line of draft of the machine may be correspondingly varied with the resultant change in the angular relation of the draft members or bars 58 and 59 with respect to each other and to the frame of the machine.

In the use of the machine, as thus made and provided, it is contemplated that various arrangements of the discs or blades 55 are to be effected to adapt the machine for the different cultivating and harrowing operations as hereinbefore indicated for the same. As shown in Figure 1, the several discs or blades 55 of the leading gang of the same are preferably disposed to throw the soil toward the right-hand side of the machine with respect to the forward direction of travel thereof, while the disc blades of the rearwardly disposed or trailing gang are arranged in a reverse order to throw the soil back toward the left-hand side of the machine, which consequently results in reducing the soil to a finely broken up or pulverized condition, and, at the same time, tends to level off the soil so treated. By disposing the discs or blades 55 at a substantial angle to one side or the other of the line of forward travel of the machine, as shown in this figure, the soil is more effectively broken up, than would otherwise be the case. With the blades adjusted to these angular positions, the machine may be used for ordinary open field cultivation, and, with the draft being offset to one side or the other of the center front of the main frame, formed by the longitudinal members or bars 10 and 11 and the alined pairs of transverse members or bars 16—17, and 18—19, the cultivator may be readily employed for conditioning the soil in orchards or grooves, as will be readily understood. With the several discs or blades 55 angularly disposed, as in Figure 1, the same may be brought into parallel relation to each other and to the longitudinal center of the main supporting frame by forcing the intermediate transverse frame sections to the left, in which movement the several carrier members or bars 28, 29, 30 and 31 will swing on the several pivots 50.

As shown in Figure 2, the several discs or blades 55 may be operated in vertical positions, or the same may be angularly offset from their normally vertical positions of operation, as is shown in dotted lines, and this is readily accomplished by loosening up on the pivot bolts or screws 49 at the front and rear ends of the several groups of carrier members or bars 28, 29, 30 and 31, and giving the latter a partial turn thereon for the purpose, after which these bolts or screws can be tightened to retain the carrier members or bars in properly adjusted positions. As the intermediate frame sections formed by the pairs of alined frame members 32, 33, 34 and 35, and their splice bars 36 move toward the left-hand side of the machine, they also move toward each other and force the coupling bars 39 into substantially parallel relation therebetween. With these frame sections thus disposed, and the discs or blades 55 disposed in vertical relation with respect thereto, the machine can be readily moved from one place of use to another with a minimum effect on the ground surface over which it is caused to travel.

As shown in Figure 6, the discs or blades 55 of each of the front or leading and the rear or trailing gangs are arranged in sets of an equal number of discs or blades, which, with the discs or blades of one set disposed in reversed relation with respect to the other thereof in each gang, so that the soil is thrown outwardly from the longitudinal center of the machine to the opposite sides thereof by the action of the front or leading gang, while the rear or trailing gang will throw the initially cultivated soil back toward the longitudinal center of the machine to form beds or hills.

In Figure 7, the oppositely disposed sets of discs or blades 55 of both the front or leading and the rear or trailing gangs thereof are arranged to cause the front and rear sets at each side of the machine to throw the cultivated soil outwardly in opposite directions from the right and left-hand sides of the longitudinal center thereof, by which arrangement beds or hills may be levelled after the crops have been gathered therefrom. In this instance of the interchangeability of the discs or blades 55 and the adjustment of the same to angular relation with respect to the longitudinal center of the machine, wherein the oppositely and reversely arranged sets of discs of the rear or trailing gang are spaced apart at a greater distance to either side of the longitudinal center of the machine than are the sets of discs or blades of the front or leading gang, the latter sets are preferably left in normally disposed positions, and the splice bars 21 and 36 are removed from between the alined sets of transverse members or bars 18 and 19; 32 and 33; and 34 and 35 to allow for the proper angular disposition of the several sets of carrier members or bars 28, 29, 30 and 31, and consequently of the several discs 55 carried thereby to corresponding angular positions. After the proper adjustment has been made, the splice bar 21 is preferably replaced between the rearmost set of the transverse frame members or bars 18 and 19 to lend rigidity to the rear end of the frame structure.

In any one of the several forms of the invention, the leading and trailing gangs or sets of soil conditioning elements or discs 55 are to be set to any one of their two positions of operation, i. e., either parallel to the line of draft of the machine or in angular relation thereto, by first attaching one or the other of the opposite ends of the coupling members 38 and 39 from a complemental of the auxiliary frame members or bars 32, 33, 34 and 35, when the latter may be shifted either to the right or left, as the case may be, and thereafter the detached ends of the coupling members or bars 38 and 39 will be again secured in place; it being understood that each of the vertical flanges of the members or bars 32, 33, 34 and 35 is provided with a series of apertures spaced along the same to receive the bolt fasteners employed for securing the brackets 43, 45 and 47 to which the opposite ends of the bars 38 and 39 are pivoted in adjusted position thereof. Thus, the gangs of the working elements or discs are securely braced in either of the positions of operation as aforesaid.

In the form of the machine as shown in Figure 1, and when the same is to be changed over to the forms, as illustrated in Figures 6 and 7, the splice bars 36 are to be removed in order to allow for the independent adjustment of the auxiliary frame members or bars 32, 33, 34 and 35 and the sets of soil working elements or discs 55 associated therewith. When the splice bars 36 are employed, as in Figure 1, the auxiliary frame members or bars 32, 33, 34 and 35 are connected in pairs thereby so that the members or discs 55 associated with each pair are shifted from one position of operation to another simultaneously therewith.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. In a machine of the class described, a main frame, auxiliary frame members carried by said main frame and formed to provide transversely separable sections, soil working elements mounted for angular movement and arranged in sets one carried by each of the said sections, the elements of one set being in reversed working relation to those of the other, means for adjusting the said sections transversely in opposite directions to dispose the respective elements carried thereby in angular relation to either side of the longitudinal center of the frame, means for sustaining the said sections in adjusted positions, and means for adjusting said elements at an angle to the normal vertical positions thereof.

2. In a machine of the class described, a main frame, auxiliary frame members carried by said main frame and formed to provide transversely separable sections, soil working elements mounted for angular movement and arranged in sets one carried by each of the said sections, the elements of one set being in reversed working relation to those of the other, means for adjusting said sections transversely in opposite directions to dispose the respective elements carried thereby in angular relation to either side of the longitudinal center of the frame, means for sustaining the said frame sections in adjusted positions, means for adjusting said elements at an angle to the normal vertical positions thereof, and draft means attached to the forward side of said frame.

3. In a machine of the class described, a main frame, auxiliary frame members carried by said main frame and formed to provide transversely separable sections, soil working elements mounted for angular movement and arranged in sets one carried by each of the said sections, the elements of one set being in reversed working relation to those of the other, means for adjusting said sections transversely in opposite directions to dispose the respective elements carried thereby in angular relation to either side of the longitudinal center of the frame, means for securing said sections in adjusted positions, means for adjusting said elements at an angle to the normal vertical positions thereof, and offset draft means attached to the forward side of said frame.

4. In a machine of the class described, a main frame, auxiliary frame members carried by said main frame and formed to provide transversely separable sections, soil working elements mounted for angular movement and arranged in sets one carried by each of the said sections, the elements of one set being in reversed working relation to those of the other, means for adjusting said sections transversely in opposite directions to dispose the respective elements carried thereby in angular relation to either side of the longitudinal center of the frame, means for securing said sections in adjusted positions, means for adjusting said elements at an angle to the normal vertical positions thereof, and adjustable offset draft means attached to the forward side of said frame.

5. In a machine of the class described, a main frame, auxiliary frame members carried by said main frame and formed to provide transversely separable sections, soil working elements mounted for angular movement and arranged in sets one carried by each of the said sections the elements of one set being in reversed working relation to those of the other, means for adjusting said sections transversely in opposite directions to dispose the respective elements carried thereby in angular relation to either side of the longitudinal center of the frame, means for sustaining the said sections in adjusted positions, means for adjusting said elements at an angle to the normal vertical positions thereof, and transversely adjustable draft means attached to the forward side of said frame.

6. In a machine of the class described, a main frame, auxiliary frame members carried by the front and rear sides of the main frame and formed to provide transversely separable sections, soil working elements mounted for angular movement and arranged in sets one carried by each of the said sections the elements of one set being in reversed working relation to those of the other, means for adjusting said sections transversely in opposite directions to dispose the respective elements carried thereby in angular relation to either side of the longitudinal center of the frame, means for securing said sections in adjusted positions, means for adjusting said elements at an angle to the normal vertical positions thereof, and angularly adjustable draft means attached to the forward side of said frame.

7. In a machine of the class described, a frame formed to provide transversely separable sections, soil working elements mounted for angular movement and arranged in sets, one carried by each frame section, means for adjusting said frame sections transversely in opposite directions to dispose the respective elements carried thereby in angular working relation to each side of the longitudinal center of the frame, means for securing said frame sections in adjusted positions, and means for adjusting said elements at an angle to the normal vertical positions thereof.

Signed at Redlands in the county of San Bernardino and State of California this 20th day of February, 1928.

JAMES S. STEWART.